United States Patent Office 3,781,412
Patented Dec. 25, 1973

3,781,412
METHOD OF REDUCING POTASSIUM ION CONCENTRATION IN PERCHLORATE SOLUTIONS
Raymond C. Rhees, Henderson, Nev., assignor to Kerr-McGee Chemical Corp.
No Drawing. Filed Jan. 6, 1969, Ser. No. 789,416
Int. Cl. C01b 11/18
U.S. Cl. 423—476
16 Claims

ABSTRACT OF THE DISCLOSURE

A method of reducing the potassium ion concentration in a perchlorate solution to less than about 5 mg. potassium per liter by contacting the perchlorate solution with crystals of the perchlorate salt of which the solution is formed. The potassium ions in the solution, upon contacting the crystals, exchange with ions in the crystals and are adsorbed on the crystals to thereby remove potassium from solution. The solution when separated from the crystals, provides a solution from which a perchlorate salt, substantially free of potassium impurities may be produced.

BACKGROUND OF THE INVENTION

(1) Field of the invention

This invention relates to a method of removing potassium ions from a perchlorate solution which contains potassium impurities. More particularly, the invention relates to the treatment of a perchlorate solution to reduce the potassium ion concentration therein to less than about 5 mg. potassium per liter, so that a perchlorate salt, substantially free of potassium impurities, may be produced.

(2) Description of the prior art

Ammonium perchlorate is a strong oxidizing agent and is used as the primary oxidizer in solid propellant missile systems. It is produced commercially by reacting sodium perchlorate and an ammonium salt, with the ammonium perchlorate being recovered by fractional crystallization. The ammonium perchlorate thus produced may contain varying amounts of alkali metal contaminants, due to impurities present in the reactants, particularly sodium perchlorate. Such contaminants in the ammonium perchlorate are undesirable, especially when the material is to be used in propellants in rocket and missile systems, for the contaminants can have a significant adverse effect on the performance of the solid propellant rocket or missile. Sodium and potassium contaminants are particularly objectionable where radar contact and/or control of the rocket or missile is required, for ionization of sodium and potassium in rocket exhaust gases causes radar attenuation. To prevent such attenuation problems, it is preferred to use ammonium perchlorate containing less than about 25 p.p.m. each of sodium and potassium.

The level of sodium contamination in the ammonium perchlorate generally can be controlled by established crystallization techniques since sodium tends to remain in solution during crystallization of ammonium perchlorate. Potassium perchlorate, however, due to its low solubility, crystallizes with ammonium perchlorate and is quantitatively carried into the ammonium perchlorate crystals, so that the product obtained is seriously contaminated with potassium impurities. As a result, ammonium perchlorate produced by conventional, commercial procedures usually contains about 50 to 200 p.p.m. of potassium. Attempts to purify ammonium perchlorate by recrystallization result in the concentration of potassium impurities in the recrystallized product, rather than separation of the potassium.

Several techniques have been suggested heretofore for reducing the potassium concentration in ammonium perchlorate crystals including the use of conventional ion exchange resins and potassium precipitants. However, these suggested techniques have not been completely satisfactory. Therefore, it has usually been necessary heretofore to use high purity reactants in order to produce ammonium perchlorate crystals having a low potassium content. However, the cost of such high purity reactants makes such a production of ammonium perchlorate commercially unattractive.

SUMMARY OF THE INVENTION

Crystals of a perchlorate salt containing less than about 25 p.p.m. potassium purities may be produced by crystallization from perchlorate solution which contains less than about 5 mg. potassium per liter. This invention provides a method by which the potassium ion concentration in a perchlorate solution may be reduced to less than about 5 mg. potassium per liter so that a perchlorate salt, substantially free of potassium contamination, may be produced.

This reduction in potassium ion concentration is achieved by contacting a saturated perchlorate solution with a sufficient amount of solid ammonium or sodium perchlorate crystals. It has been discovered that solid ammonium and sodium perchlorate crystals act as effective agents for the removal of potassium impurities from a solution saturated or substantially saturated with ammonium perchlorate or sodium perchlorate. The potassium ions, upon contacting the crystals, are exchanged for the ammonium ions or sodium ions at the surface of the crystals and are adsorbed on the crystals, thereby removing potassium from solution.

The rate of potassium removal from the perchlorate solution is dependent on the concentration of potassium ions in the solution to be treated and the ratio of solid crystal surface to volume of solution treated. The rate of potassium removal is enhanced by providing a high crystal surface to solution ratio and by providing fresh crsytal surfaces for contact with the solution. A number of contact techniques may be used in practicing this invention.

DESCRIPTION OF THE PREFERRED EMBODIMENTS

In the practice of the present invention, a perchlorate solution containing potassium impurities is contacted with an amount of solid perchlorate crystals sufficient to reduce the potassium concentration in the solution to less than about 5 mg. of potassium per liter. Potassium ions are removed from the perchlorate solution by adsorption and exchange on the solid perchlorate crystal surfaces.

Generally, the solution treated according to this invention is a saturated or substantially saturated solution of ammonium perchlorate, such as that produced by the reaction of sodium perchlorate with ammonia and hydrochloric acid, as described in U.S. Pat. No. 2,739,873. The potassium ion concentration in such a solution saturated with ammonium perchlorate at about 50° C. is usually greater than 20 mg. potassium per liter, due to potassium impurities present in the reactants, particularly the sodium perchlorate. Such a solution contains about 75 p.p.m. potassium, based on the ammonium perchlorate content of the saturated solution. Ammonium perchlorate crystals obtained from such a solution by conventional crystallization procedures will be seriously contaminated with potassium impurity and may contain up to 200 p.p.m. of potassium. This is due to the fact that potassium is selectively adsorbed or concentrated in crystals of ammonium perchlorate when the perchlorate is crystallized from solution. As will be discussed in more detail hereinbelow, other perchlorate solutions which contain potassium impurity may also be used in this invention.

The method of contacting the solution with the crystals, the length of time of contact and the amount of crystals contacted with the contaminated perchlorate solution may be varied considerably, but must be sufficient to reduce the potassium ion concentration in the solution to below about 5 mg. potassium per liter. The rate of potassium removal from the perchlorate solution depends on the frequency of collision of potassium ions in the solution with the crystal surfaces. This frequency of collision is dependent primarily on the ratio of solid ammonium perchlorate crystal surface to solution volume, as well as the level of potassium ion concentration in the perchlorate solution. Therefore, contact techniques which provide a high ratio of ammonium perchlorate crystals to solution volume are preferred, for such a high solids to solution ratio enhances the rate of potassium removal from the solution and provides rapid reduction of potassium values in the perchlorate solution. The rate of potassium removal from solution is also enhanced by the use of contact techniques which are capable of providing fresh ammonium perchlorate surfaces for contact with the solution, that is, crystal surfaces not previously contacted by a concentration of potassium ions.

Generally, the highest ratio of solid crystal surface to solution volume is obtained by passing the saturated ammonium perchlorate solution through a bed of solid ammonium perchlorate crystals, such as in an ion exchange column. By passing the saturated perchlorate solution counter-current to fresh ammonium perchlorate crystal surfaces, with continued or periodic removal of ammonium perchlorate crystals high in potassium content in the region of the incoming solution, maximum efficiency in potassium removal from the solution may be obtained. Such a contact technique provides the additional advantage that ammonium ions may be regenerated on the crystal surfaces by controlling the concentration and temperature of the ammonium perchlorate solution to permit slight ammonium perchlorate crystallization in the bed of ammonium perchlorate crystals. Thus, by slightly cooling the saturated perchlorate solution as it passes through the bed of perchlorate crystals, small amounts of ammonium perchlorate can be crystallized out of solution onto the perchlorate crystals in the bed. By such a controlled slow crystal growth the ion exchange surface in the crystal bed may be continuously renewed.

Another suitable technique for reducing the potassium concentration in the perchlorate solution to less than about 5 mg. per liter is by passing the saturated perchlorate solution through a series of two or more tanks with fresh ammonium perchlorate crystals being provided to the last tank of the series, and moving the crystals forward through the tanks as the potassium value rises in the tanks. In this manner, the potassium concentration in the solution is progressively reduced as the solution is passed through the tanks. Fresh perchlorate crystals may be provided in the tanks by controlling the temperature of the ammonium perchlorate solution in the tanks so as to promote slow crystallization of ammonium perchlorate from solution.

Another relatively simple but effective method for reducing the potassium ion concentration in the perchlorate solution to the desired level is by introducing ammonium perchlorate crystals into a tank of saturated ammonium perchlorate solution to provide a slurry containing solid ammonium perchlorate crystals, and agitating the slurry, either continuously or periodically, to provide contact between the solution and the crystal surfaces. Such a slurry must contain an amount of perchlorate crystals sufficient to reduce the potassium concentration to less than about 5 mg. per liter within a reasonable period of time. Generally, it is preferred that the slurry contain at least about 20% by weight of solid ammonium perchlorate crystals. While a lesser amount of perchlorate crystals in the slurry may reduce the potassium concentration in the perchlorate solution, a prohibitively long contact time may be required to reduce the potassium concentration to less than about 5 mg. per liter. Of course, if such longer periods of contact time are not objectionable, the slurry may contain less than about 20% by weight of crystal solids. For example, when the slurry contains only about 10% by weight of solid perchlorate crystals, the crystals must be maintained in contact with the solution for more than six hours to reduce the potassium concentration in the solution from about 25 mg. per liter to less than 5 mg. per liter.

Fresh crystal surfaces may also be provided in such a slurry by slow crystallization of ammonium perchlorate from the saturated solution, such as, by cooling the solution. In this manner, the time between cycles for regeneration or replacement of the surface exhausted crystals, that is, crystals saturated with potassium ions, may be extended.

The ratio of ammonium perchlorate crystals to perchlorate solution volume and the length of contact time between the crystals and solution necessary to reduce the potassium concentration in the solution to less than about 5 mg. per liter are inversely related. As the crystal to solution ratio is increased, the length of time required to maintain the solution in contact with the crystals is decreased. Conversely, as the crystal to solution ratio is decreased, longer periods of contact time are required.

As mentioned hereinabove, a high ratio of crystal surface to solution volume promotes the rate of potassium removal from the perchlorate solution. Therefore, it is usually preferred to contact the perchlorate solution with solid perchlorate crystals which are relatively small in size, that is, the particle size of the crystals is such that about 90% of the crystals will pass through a 50 mesh screen and about 20% to 40% of the crystals will pass through a 100 mesh screen (U.S. Standard Sieve Series). A relatively rapid rate of potassium removal from the perchlorate solution may be obtained by contacting the solution with perchlorate crystals having the following particle size distribution:

| U.S. Sieve No. | Percent passing through |
| --- | --- |
| 18 | 100 |
| 50 | 90–95 |
| 70 | 50–75 |
| 100 | 20–50 |
| 140 | 5–15 |
| 325 | 0–2 |

It will be understood that coarser or finer perchlorate crystals may be used in this invention.

It has been estimated that a ratio of at least about 75 gm. of solid ammonium perchlorate crystals (having about the same size distribution as disclosed above) to one liter of saturated ammonium perchlorate solution is necessary to reduce the potassium concentration in the solution from about 20 mg. per liter to about 3 mg. per liter in one hour. If a longer contact period is not objectionable, a lower ratio of crystals to solution may be used. However, the amount of crystals used must have sufficient exchange capacity to reduce the potassium concentration in the solution to below about 5 mg. potassium per liter.

When the potassium concentration in the saturated ammonium perchlorate solution has been reduced to less than about 5 mg. per liter (or less than about 20 p.p.m. potassium based on the ammonium perchlorate contained in the solution) ammonium perchlorate containing less than 25 p.p.m. potassium impurities may be crystallized from the treated solution. The crystallization of ammonium perchlorate for the saturated solution may be carried out by any conventional crystallization procedure, such as for example, that disclosed in U.S. Pat. No. 2,739,873. The ammonium perchlorate crystals thus obtained may be washed or recrystallized to remove sodium impurities from the crystals.

The following examples are set forth to illustrate, not to limit, the invention, whereby those skilled in the art may understood more fully the manner in which the present invention may be carried into effect. In the instant specification and appended claims, all parts and percentages are by weight unless otherwise indicated.

EXAMPLE I

A substantially saturated solution of ammonium perchlorate was prepared by dissolving 2,400 gm. ammonium perchlorate in 10 liters of water. Potassium perchlorate (4.4 gm.) was then dissolved in the solution with stirring. The potassium ion concentration in this solution was about 110 mg./liter. A column, 3.5 cm. in diameter and 90 cm. in length, was filled with approximately 900 gm. of ammonium perchlorate crystals. The particle size of the ammonium perchlorate crystals used was such that about 90% of the crystals passed through a 50 mesh screen and about 20% to 40% passed through a 100 mesh screen (U.S. Standard Sieve Series).

The substantially saturated ammonium perchlorate solution was then contacted with ammonium perchlorate crystals by passing the solution at varying rates through the column. Thus, 2,000 ml. of the solution was passed upward through the column at rates of 98 ml./min., 180 ml./min. and 260 ml./min., using a positive displacement pump. The effluent from the column was collected and samples of the effluent analyzed for potassium. The column was repacked with fresh ammonium perchlorate crystals between each rate run. The results of this series of tests are given in Table I.

TABLE I

| Flow rate (ml./min.): | Potassium ion concentration in effluent (mg./l.) |
|---|---|
| 98 | 1.0 |
| 180 | 1.2 |
| 260 | <0.2 |

The data clearly show the marked reduction in potassium concentration in the ammonium perchlorate solution after contact with the ammonium perchlorate crystals in the column. Ammonium perchlorate crystallized from the saturated ammonium perchlorate solution obtained from the column would have a potassium content of below 25 p.p.m.

EXAMPLE II

A series of three tests was run in order to show the effect of the perchlorate crystal to solution ratio on the rate of potassium removal from the solution.

In the first test, 75 gm. of ammonium perchlorate, which contain about 85 p.p.m. of potassium impurity, was dissolved in 300 ml. of distilled water to provide a substantially saturated solution at 25° C. A quantity of potassium impurity was then added to provide a solution containing approximately 100 mg. of potassium per liter. After complete solution, an additional 120 gm. of solid ammonium perchlorate crystals was added to the saturated solution to provide a slurry containing about 24% by weight of solid ammonium perchlorate crystals. The slurry was stirred rapidly to maintain intimate contact between the solution and the crystals. Samples of the solution were taken at intervals, using a cotton-plugged pipette, and the samples analyzed for potassium, using a spectrophotometer. The results of this test are shown in Table II, and are identified as Test 1.

In the second test, the procedure described above for Test 1 was repeated with the single exception that 360 gm. rather than 120 gm. of solid ammonium perchlorate crystals was added to the saturated ammonium perchlorate solution. In this manner a slurry was obtained which contained about 49% by weight of solid ammonium perchlorate crystals in the saturated ammonium perchlorate solution. The results of this test are shown in Table II and are identified as Test 2.

In the third test, the procedure described above for Test 1 was repeated with the single exception that no potassium perchlorate was added to the ammonium perchlorate solution to raise the potassium concentration in the solution. The results of this test are shown in Table II and are identified as Test 3.

The ammonium perchlorate crystals used in each of the three tests of this example had a particle size distribution such that about 90% of the crystals passed through a 50 mesh screen and about 20% to 40% of the crystals passed through a 100 mesh screen.

TABLE II

| Time (min.) | Potassium ion concentration in solution (mg./l.) | | |
|---|---|---|---|
| | Test 1 | Test 2 | Test 3 |
| 0 | 98 | 102 | 12 |
| 5 | 46 | 12 | 7.0 |
| 10 | 33 | 8.8 | 3.2 |
| 20 | 26 | 6.8 | 3.4 |
| 40 | 16 | 6.1 | 3.8 |
| 80 | 10 | 4.2 | 3.0 |
| 160 | 8.6 | | |
| 320 | 7.2 | | |
| 540 | 5.5 | | |
| 1,440 | 2.2 | | |
| 2,880 | 2.5 | | |

This data clearly show that the potassium concentration in an ammonium perchlorate solution can be reduced to below 5 mg. per liter by introducing solid ammonium perchlorate crystals into a saturated solution of ammonium perchlorate. The effect of the slurry density (that is, the ratio of solid crystals to solution volume) on the rate of potassium removal from the solution and the contact time required to achieve the desired reduction in potassium concentration is shown by a comparison of Tests 1 and 2. The effect of potassium ion concentration in the solution to be treated on the contact time required to achieve the desired reduction in potassium contamination is shown by a comparison of Tests 1 and 3.

The ammonium perchlorate used in each of the three tests to form the saturated ammonium perchlorate solution contained about 85 p.p.m. of potassium. The fact that only 12 mg. of potassium per liter was found in the initial perchlorate solution in Test 3 is believed to be due to the fact that some potassium had exchanged and adsorbed on the perchlorate crystals even in the short time before removal of the sample for analysis.

EXAMPLE III

This example illustrates the manner in which ammonium perchlorate crystals containing less than 25 p.p.m. each of potassium and sodium contaminants may be produced by the present invention.

A solution saturated with ammonium perchlorate and containing more than about 20 mg. potassium per liter was fed into a tank. A quantity of solid ammonium perchlorate crystals was introduced into the tank in an amount sufficient to provide a slurry containing about 35% by weight of undissolved ammonium perchlorate crystals. The slurry was agitated and pumped from the tank. The solid ammonium perchlorate crystals were then separated from the slurry and the saturated perchlorate solution was recycled to the tank where fresh ammonium perchlorate crystals were added to the solution to again provide a slurry containing about 35% by weight solid crystals. This procedure was continuously repeated.

After the saturated ammonium perchlorate solution had been in contact with the solid perchlorate crystals for about 2.5 hours, a portion of the saturated solution being recycled to the tank was removed and stored as the feed solution for the production of ammonium perchlorate low in potassium contamination. This feed solution, which was saturated with ammonium perchlorate, contained about 2.5 mg. of potassium per liter and about 1,300 mg. of sodium per liter.

This feed solution was then concentrated and cooled, and ammonium perchlorate crystallized out of solution. The ammonium perchlorate crystals were separated from the solution and discharged into a tank of saturated ammonium perchlorate solution in order to remove sodium impurities from the crystals. This slurry was then centrifuged to separate the perchlorate crystals from the saturated solution which was recycled to the tank. The crystals separated in the centrifuge were again washed with a saturated ammonium perchlorate solution to further remove sodium impurity. The washed crystals were then dried and recovered. The ammonium perchlorate crystals thus recovered contained about 12 p.p.m. potassium and less than 10 p.p.m. sodium.

This clearly shows that the present invention is effective in producing ammonium perchlorate substantially free of alkali metal impurities.

It will be understood that perchlorate solutions, other than ammonium perchlorate, which contain potassium impurity, may also be treated according to the present invention to reduce the potassium concentration in the solution. As discussed hereinabove, potassium impurities in the sodium perchlorate reactant used in the formation of ammonium perchlorate usually are the source of potassium impurity present in the ammonium perchlorate crystals. The potassium concentration in the sodium perchlorate reactant may also be reduced to below about 5 mg. of sodium per liter by the process of this invention. In this manner, the ammonium perchlorate produced from such a low potassium sodium perchlorate reactant will contain less than about 25 p.p.m. potassium.

According to this embodiment, a saturated or substantially saturated solution of sodium perchlorate (which contains potassium impurity) is contacted with solid sodium perchlorate crystals whereby the potassium exchanges at the surface of, and is adsorbed on, the sodium perchlorate crystals and is thereby removed from the solution. The resulting saturated sodium perchlorate solution, containing less than about 5 mg. of potassium per liter may then be used as a reactant in the production of ammonium perchlorate which contains less than 25 p.p.m. potassium.

The sodium perchlorate solution may be contacted with the solid sodium perchlorate crystals according to the same procedures described above for the ammonium perchlorate solution-ammonium perchlorate crystal contact system.

While the invention has been described with respect to what at present are believed to be the preferred embodiments thereof, it will be understood that various changes and modifications may be made therein within the principle and scope of the invention as defined in the appended claims.

What is claimed is:

1. A method of reducing the potassium ion concentration in a perchlorate salt selected from the group consisting of sodium perchlorate and ammonium perchlorate which contains potassium impurity which comprises
contacting a solution of said perchlorate salt containing potassium ion impurity with an effective quantity of substantially potassium ion-free crystals of said perchlorate salt selected from the group consisting of sodium perchlorate and ammonium perchlorate for a period of time sufficient for a substantial portion of the potassium ions in the solution to exchange with ions in the crystals and be adsorbed on the crystals,
controlling the temperature of the solution to permit, at most, only slight perchlorate crystallization out of solution onto the perchlorate crystals and thereafter
separating the crystals from the resulting perchlorate salt solution to provide a solution in which the potassium ion concentration is less than about 5 mg. per liter.

2. The method defined in claim 1 in which said potassium-containing perchlorate solution is contacted with said crystals by passing the solution through a bed of the crystals.

3. The method defined in claim 2 in which said perchlorate solution is a substantially saturated solution of ammonium perchlorate and is passed through a bed of ammonium perchlorate crystals.

4. The method defined in claim 1 in which said potassium-containing perchlorate solution is contacted with said crystals by introducing said crystals into said solution in an amount sufficient to provide a slurry having a saturated solution portion and an undissolved crystal portion, and maintaining said undissolved crystal portion in contact with said saturated solution portion to remove said potassium impurity.

5. The method defined in claim 4 in which said potassium-containing perchlorate solution is a substantially saturated solution of ammonium perchlorate and said crystals are ammonium perchlorate.

6. The method defined in claim 4 in which said potassium-containing perchlorate solution is a substantially saturated solution of sodium perchlorate and said crystals are sodium perchlorate.

7. The method defined in claim 4 in which the amount of crystals introduced into said perchlorate solution is sufficient to provide a slurry containing at least about 20% by weight of said undissolved crystals.

8. A process of producing crystals of a perchlorate salt selected from the group consisting of sodium perchlorate and ammonium perchlorate containing less than about 25 p.p.m. of potassium impurity which comprises
contacting a solution of said perchlorate salt containing potassium ion impurity with an effective quantity of substantially potassium ion-free crystals of said perchlorate salt selected from the group consisting of sodium perchlorate and ammonium perchlorate whereby the potassium ions in said solution, upon contact with said crystals, are adsorbed on said perchlorate salt crystals and removed from said solution,
maintaining said solution in contact with said crystals for a period of time sufficient to reduce the potassium ion concentration in said solution to less than about 5 mg. per liter,
controlling the temperature of the solution to permit, at most, only slight perchlorate crystallization out of solution onto the perchlorate crystals,
separating the solution depleted in potassium ions from said crystals, and
cooling the potassium depleted solution to obtain perchlorate salt crystals containing less than about 25 p.p.m. potassium impurity therefrom.

9. The process defined in claim 8 in which the potassium-containing solution is a solution substantially saturated with ammonium perchlorate which is contacted with ammonium perchlorate crystals, and the solution depleted in potassium ions is cooled to precipitate ammonium perchlorate crystals containing less than about 25 p.p.m. potassium impurity.

10. The process defined in claim 9 in which the ammonium perchlorate solution is contacted with said crystals by passing the solution through a bed of the ammonium perchlorate crystals.

11. The process defined in claim 9 in which said ammonium perchlorate solution is contacted with said crystals by introducing said crystals into said solution in an amount sufficient to provide a slurry having a saturated solution portion and an undissolved crystal portion, and maintaining said undissolved crystal portion in contact with said saturated solution portion to remove said potassium impurity.

12. The process defined in claim 11 in which the amount of crystals introduced into said perchlorate solution is sufficient to provide a slurry containing at least about 20% by weight of said undissolved crystals.

13. The process defined in claim 8 in which the potassium-containing solution is a solution substantially saturated with sodium perchlorate, said solution is contacted with sodium perchlorate crystals, and the resulting solution depleted in potassium ions is reacted with an ammonium ion-containing compound to obtain ammonium perchlorate salt crystals containing less than about 25 p.p.m. potassium impurity.

14. The process defined in claim 13 in which the sodium perchlorate solution is contacted with said crystals by passing the solution through a bed of the sodium perchlorate crystals.

15. The process defined in claim 13 in which the sodium perchlorate solution is contacted with said crystals by introducing the sodium perchlorate crystals into said solution in an amount sufficient to provide a slurry having a saturated solution portion and an undissolved crystal portion and maintaining said undissolved crystal portion in contact with said saturated solution portion to remove said potassium impurity.

16. The process defined in claim 15 in which the amount of sodium perchlorate crystals introduced into said sodium perchlorate solution is sufficient to provide a slurry containing at least about 20% by weight of said undissolved crystals.

References Cited

UNITED STATES PATENTS

| | | | |
|---|---|---|---|
| 2,540,977 | 2/1951 | Arnold | 23—297 X |
| 3,307,903 | 3/1967 | Lazari | 23—85 |
| 3,424,549 | 1/1969 | Godfrey | 23—296 X |
| 3,498,759 | 3/1970 | Kralik | 23—302 |
| 2,489,572 | 11/1949 | Hampel | 23—85 |
| 2,739,873 | 3/1956 | Schumacher | 23—85 |

OTHER REFERENCES

Seidell, "Solubilities," vol. II, 4th ed., pp. 178, 179, 684, 1018 and 1367 (1965), American Chemical Society, Washington, D.C., copied in Scientific Library, QD 66 S45.

CARL D. QUARFORTH, Primary Examiner

E. A. MILLER, Assistant Examiner

U.S. Cl. X.R.

23—302, 312 R; 149—76